US008393987B2

United States Patent
Sato et al.

(10) Patent No.: US 8,393,987 B2
(45) Date of Patent: Mar. 12, 2013

(54) CHAIN TENSIONER

(75) Inventors: Seiji Sato, Iwata (JP); Satoshi Kitano, Iwata (JP); Hisashi Hayakawa, Iwata (JP); Tasuku Furukawa, Iwata (JP)

(73) Assignee: NTN Corporation, Osaka (JP)

( * ) Notice: Subject to any disclaimer, the term of this patent is extended or adjusted under 35 U.S.C. 154(b) by 551 days.

(21) Appl. No.: 12/581,945

(22) Filed: Oct. 20, 2009

(65) Prior Publication Data

US 2010/0099529 A1    Apr. 22, 2010

(30) Foreign Application Priority Data

Oct. 22, 2008  (JP) .................................. 2008-272178
Feb. 3, 2009   (JP) .................................. 2009-022179

(51) Int. Cl.
*F16H 7/22*    (2006.01)
*F16H 7/08*    (2006.01)

(52) U.S. Cl. .......................... 474/110; 474/103; 474/111

(58) Field of Classification Search .................. 474/110, 474/111, 103
See application file for complete search history.

(56) References Cited

U.S. PATENT DOCUMENTS

| | | | | |
|---|---|---|---|---|
| 2,703,019 A | * | 3/1955 | Burawoy | 474/110 |
| 3,455,178 A | * | 7/1969 | Karl et al. | 474/110 |
| 4,425,104 A | * | 1/1984 | Ojima | 474/111 |
| 4,863,417 A | * | 9/1989 | Kimata et al. | 474/101 |
| 5,259,820 A | * | 11/1993 | Mott | 474/110 |
| 5,277,664 A | * | 1/1994 | Mott | 474/110 |
| 5,713,809 A | * | 2/1998 | Yamamoto et al. | 474/110 |
| 5,961,410 A | * | 10/1999 | Yamamoto | 474/110 |
| 6,146,300 A | * | 11/2000 | Suzuki et al. | 474/111 |
| 6,450,908 B2 | * | 9/2002 | Ishii et al. | 474/138 |
| 6,591,657 B1 | * | 7/2003 | Kato | 72/398 |
| 6,808,466 B2 | * | 10/2004 | Yoshida et al. | 474/110 |
| 7,037,229 B2 | * | 5/2006 | Hayakawa et al. | 474/110 |
| 7,559,863 B2 | * | 7/2009 | Onimaru et al. | 474/110 |
| 7,654,924 B2 | * | 2/2010 | Sato et al. | 474/110 |

(Continued)

FOREIGN PATENT DOCUMENTS

| | | |
|---|---|---|
| JP | 3-020109 | 1/1991 |
| JP | 10-132039 | 5/1998 |

(Continued)

OTHER PUBLICATIONS

A Japanese Office Action issued May 8, 2012 in a counterpart foreign application (with partial English translation).

(Continued)

*Primary Examiner* — Michael Mansen
*Assistant Examiner* — Henry Liu
(74) *Attorney, Agent, or Firm* — Wenderoth, Lind & Ponack, L.L.P.

(57) ABSTRACT

A chain tensioner includes a cylinder having a closed end, an internally threaded plunger axially slidable in the cylinder, a return spring biasing the plunger in the protruding direction from the cylinder, and a screw rod having an external thread in threaded engagement with the internal thread of the plunger. The portion of the screw rod protruding from the plunger abuts a rod seat provided in the cylinder. The screw rod has a rolled external thread and an intermediate portion protruding from the plunger and having an outer diameter smaller than the diameter of the root of the external thread. The screw rod has a forged contact surface, to be contacted with the rod seat, on the axial end face of the intermediate portion. The internal thread may be formed by pressing, and a pressed recess, corresponding to the internal thread, may be formed on the plunger's outer circumference.

13 Claims, 6 Drawing Sheets

U.S. PATENT DOCUMENTS

| | | | |
|---|---|---|---|
| 2002/0052259 A1* | 5/2002 | Nakakubo et al. | 474/109 |
| 2003/0139235 A1* | 7/2003 | Yamamoto et al. | 474/109 |
| 2003/0186764 A1* | 10/2003 | Yoshida et al. | 474/109 |
| 2004/0091193 A1* | 5/2004 | Obayashi et al. | 384/623 |
| 2005/0087163 A1* | 4/2005 | Maeno et al. | 123/90.54 |
| 2006/0116229 A1* | 6/2006 | Sato et al. | 474/110 |
| 2008/0280712 A1* | 11/2008 | Ryouno et al. | 474/110 |
| 2010/0087285 A1* | 4/2010 | Sato et al. | 474/110 |
| 2010/0093474 A1* | 4/2010 | Onimaru et al. | 474/110 |

FOREIGN PATENT DOCUMENTS

| | | |
|---|---|---|
| JP | 2001-124159 | 5/2001 |
| JP | 2002-357250 | 12/2002 |
| JP | 2004-138152 | 5/2004 |
| JP | 3748656 | 2/2006 |
| JP | 2007-032603 | 2/2007 |
| JP | 2007-147079 | 6/2007 |
| JP | 2009-014071 | 1/2009 |
| JP | 2010-167529 | 8/2010 |

OTHER PUBLICATIONS

Japanese Patent Office Notice of Reasons for Rejection issued Oct. 9, 2012, in a counterpart Japanese application (with partial English translation).

* cited by examiner (a)

(b)

CHAIN TENSIONER

BACKGROUND OF THE INVENTION

This invention relates to a chain tensioner used for maintaining tension of a timing chain that drives a camshaft of a vehicle engine.

Generally in an automobile engine, rotation of a crankshaft is transmitted to a camshaft through a timing chain, thereby opening and closing valves of combustion chambers by rotation of the camshaft. In many cases, to keep the tension of the chain within appropriate range, a tension adjustment device is used which comprises a chain guide provided pivotably around a support shaft and a chain tensioner pushing the chain guide toward the chain.

As a chain tensioner incorporated in this tension adjustment device, a chain tensioner is known comprising a cylinder having open and closed ends, a plunger axially slidably inserted in the cylinder, and a return spring biasing the plunger in the protruding direction from the cylinder. The plunger has an open end inserted in the cylinder and a closed end and is formed with an internal thread on the inner circumference. This chain tensioner further includes a screw rod having an external thread that is in threaded engagement with the internal thread of the plunger. The portion of the screw rod protruding from the plunger abuts a rod seat provided in the cylinder (See JP Patent Publications JP 10-132039A and JP 2001-124159A).

Also in this chain tensioner, a spring receiving hole is formed in the screw rod, receiving one end of the return spring and thereby reducing the axial length of the chain tensioner.

In the cylinder, an oil supply passage is formed, communicating with the pressure chamber defined by the plunger and the cylinder. The oil supply passage communicates with a through hole formed in the rod seat and this through hole communicates with the spring receiving hole through an oil path hole formed in the screw rod. In the through hole of the rod seat, a check valve is mounted, preventing reverse flow of hydraulic oil.

In this chain tensioner, when the tension of the chain increases during operation of the engine, the plunger is moved in the direction to be pushed into the cylinder (the "pushed-in direction", hereafter) by the tension of the chain, and thereby absorbs the tension of the chain. At this time, the screw rod rotates relative to the plunger, being moved forward and backward within the gap of the internal and external threads by vibration of the chain. Also, hydraulic oil in the pressure chamber flows out through a leak gap between the sliding surfaces of the plunger and the cylinder. Viscous resistance of hydraulic oil makes the plunger move slowly with its dampening effect.

When the tension of the chain decreases during operation of the engine, the plunger is moved in the direction to protrude from the cylinder (the "protruding direction", hereafter) by biasing force of the return spring, thereby absorbing looseness of the chain. At this time, the check valve opens and hydraulic oil flows into the pressure chamber through the oil supply passage, moving the plunger quickly.

Also, even if the tension of the chain increases because of the stop position of the cams when stopping the engine, since the chain does not vibrate while the engine is not running, the internal thread of the plunger is received by the external thread of the screw rod, thereby fixing the position of the plunger. This reduces loosening of the chain when restarting the engine, thereby making restart of the engine smooth.

The screw rod of the above-mentioned chain tensioner is shown in FIG. 8. This screw rod 41 is formed from a columnar blank. An external thread 42 on the outer circumference of the screw rod 41 is formed by rolling the outer circumference of the blank, and then an axial end of the blank is machined so as to form a contact surface 43 that contacts a rod seat (not shown) of the screw rod 41. The spring receiving hole 44 and the oil path hole 45 are also formed by machining after forming the external thread 42 by rolling.

However, it increases the processing cycle time and the cost to form the contact surface 43, spring receiving hole 44 and oil path hole 45 by machining.

To omit this machining, the contact surface 43 can be forged before rolling the external thread 42. That is, the contact surface 43 can be formed by forging one end of the blank before rolling the outer circumference of the blank 42 to form the external thread 42. However, in this method, the contact surface 43 may be deformed due to a flow of material during rolling of the external thread 42.

The object of this invention is to reduce the processing cycle time of a screw rod and a plunger, thereby reducing the production cost of a chain tensioner.

SUMMARY OF THE INVENTION

To achieve this object, the inventors of this invention found that deformation of the contact surface of the screw rod that contacts the rod seat can be avoided by providing an intermediate portion having a diameter smaller than the root diameter of the external thread on the outer circumference of the portion of the screw rod protruding from the plunger and forming the contact surface on the axial end face of the intermediate portion. This is because the flow of material is absorbed by the intermediate portion when the external thread is rolled on the outer circumference of the screw rod after forging the contact surface. Thus, the contact surface of the screw rod that contact the rod seat can be formed by forging with the possibility of deformation.

Preferably a chamfer tapering from the end of the external thread to the intermediate portion is provided on the outer circumference of the screw rod. With this configuration, a rolling die is led in smoothly, thereby rolling the external thread with high accuracy.

When forming a spring receiving hole in the screw rod so as to receive one end of the return spring, the spring receiving hole can be formed by forging. In this case, thickness of the screw rod from the root of the external thread to the inner face of the spring receiving hole is preferably not smaller than twice the height of the external thread. This maintains rigidity of the screw rod when rolling the external thread, thereby maintaining roundness of the screw rod during rolling.

When an oil supply passage is provided in the cylinder to introduce hydraulic oil into a pressure chamber defined by the plunger and the cylinder, a through hole is formed in the rod seat, communicating with the oil supply passage, and an oil path hole is formed in the screw rod through which the through hole communicates with the spring receiving hole, the oil path hole can be formed by forging.

The screw rod is preferably carburized or carbonitrided after rolling the external thread so as to form a carburized or carbonitrided layer on the surface of the screw rod. This ensures wear resistance of the contact surface of the screw rod that contacts the rod seat and wear resistance of the external thread. Surface hardness of the carburized or carbonitrided layer can be e.g. Hv 600 or higher.

When forming an internal thread on the inner periphery of a cylindrical plunger having an open end and a closed bottom at the other end using a tap, the processing has to be performed within the range in which the tip of the tap does not interfere with the bottom of the plunger. This makes the leading length of the tap insufficient, thereby making the processing of the internal thread difficult.

In the chain tensioner described in JP 2001-124159, to easily process the internal thread on the inner circumference of a plunger having one closed end and the other open end, the plunger comprises a cylindrical plunger body having two open ends and a cap portion integrally fit in the plunger body, thereby making it possible to use a tap with long leading length for processing the internal thread on the inner circumference of the plunger body.

However, even though adopting the above-mentioned configuration, the cycle time to process the internal thread on the inner circumference of the plunger with a machining tap is still long. Also, the internal thread processed with a machining tap has a rough thread surface and this may cause excessive frictional resistance between the internal and external threads. While the thread surface of this internal thread can be smoothed by rolling with a rolling tap, this process further increases the processing cycle time and the process cost.

To shorten the processing cycle time of the internal thread on the inner circumference of the plunger, the inventors of this invention found that, by providing the internal thread on the inner circumference of the plunger intermittently with circumferential intervals, the internal thread can be formed by pressing, thereby shortening the process cycle time of the thread.

Specifically, according to this invention, a round bar-shaped die is used which is formed with thread grooves corresponding to the internal thread on the inner circumference of the plunger and axial grooves communicating with the thread grooves alternately in a circumferential direction. This round bar-shaped die is inserted in the plunger and the outer circumference of the plunger is pressed in this state, thereby forming the internal thread on the inner circumference of the plunger. Then the round bar-shaped die is rotated until the internal thread on the inner circumference of the plunger is received in the axial grooves on the outer circumference of the round bar-shaped die. In this state, the round bar-shaped die can be pulled out of the plunger in the axial direction. At this time, a pressed recess is formed on the outer circumference of the plunger, corresponding to the internal thread on the inner circumference of the plunger.

Preferably, the internal thread of the plunger comprises a plurality of equiangularly spaced portions with a circumferential space defined between any adjacent equiangularly spaced portions, with each of the equiangularly spaced portions having a circumferential length shorter than the circumferential spaces. With this arrangement, the equiangularly spaced portions of the internal thread of the plunger can be reliably received in the axial grooves on the outer circumference of the round bar-shaped die.

Since the internal thread on the inner circumference of the plunger is formed by pressing, the surface of the internal thread is smooth. Thus without a smoothing process for the surface of the internal thread after pressing, the surface roughness of the internal thread is made to be no larger than Ra 6.3, thereby reducing the processing cost. When the surface roughness of the internal thread is not larger than Ra 6.3, excessive frictional resistance between the internal and external threads can be prevented.

By carbonitriding the plunger, wear resistance of the internal thread on the inner circumference of the plunger can be improved.

The radial gap between the outer diameter of the external thread on the outer circumference of the screw rod and the diameter of the circumferential spaces of the internal thread on the inner circumference of the plunger is preferably not larger than 0.5 mm to make contact between the external thread and the internal thread stable.

In the chain tensioner of this invention, since the contact surface of the screw rod that contacts the rod seat is formed by forging, there is no need of machining to form the contact surface of the screw rod that contacts the rod sheet. This reduces the processing cycle time of the screw rod, thereby reducing the production cost.

To shorten the processing cycle time of the internal thread on the inner circumference of the plunger, the inventors of this invention found that, by providing the internal thread on the inner circumference of the plunger intermittently with circumferential intervals, the internal thread can be formed by pressing, thereby shortening the process cycle time of the thread.

BRIEF DESCRIPTION OF THE DRAWINGS

FIGS. 6A to 6E show the steps of forming an internal thread on the inner circumference of the plunger shown in FIG. 4, of which:

FIG. 6A shows the step of inserting a round bar-shaped die into the plunger;

FIG. 6B shows the step of pressing the outer circumference of the plunger with the round bar-shaped die of FIG. 6A inserted in the plunger;

FIG. 6C is a sectional view taken perpendicularly to the axial direction of FIG. 6B;

FIG. 6D shows how the round bar-shaped die shown in FIG. 6B is rotated until the internal thread on the inner circumference of the plunger is received in the axial grooves on the outer circumference of the round bar-shaped die, and then the round bar-shaped die is pulled out of the plunger in the axial direction; and FIG. 6E is a sectional view taken perpendicularly to the axial direction of FIG. 6D;

DETAILED DESCRIPTION OF THE PREFERRED EMBODIMENT

Figure 1:
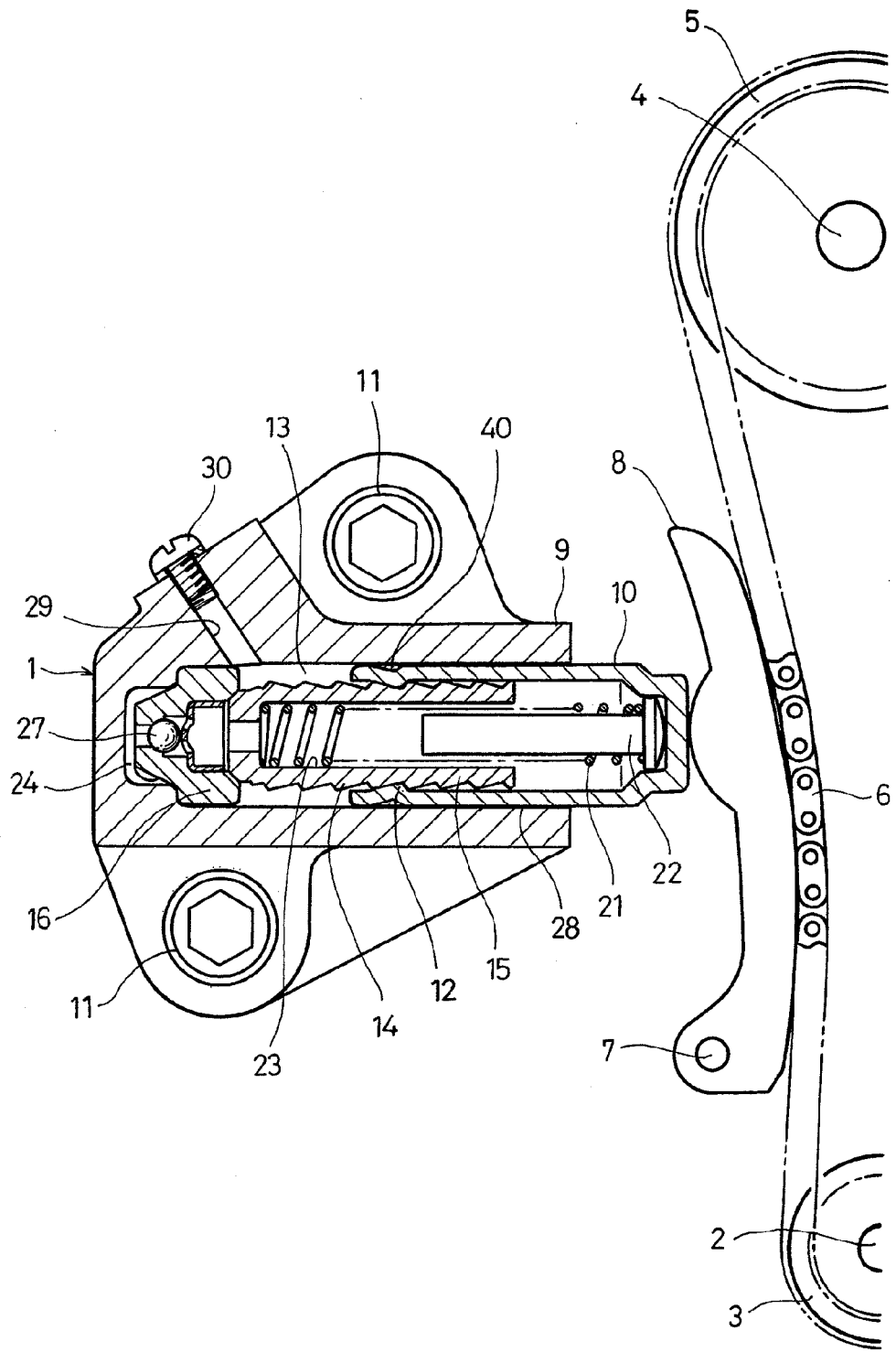
FIG. 1 is a front view of a chain transmission device mounted with a chain tensioner embodying this invention.

FIG. 1 shows a chain transmission device mounted with a chain tensioner 1 according to the embodiment of this invention. This chain transmission device includes a sprocket 3 fixed on a crankshaft 2 of an engine, a sprocket 5 fixed on a camshaft 4, and a chain 6 coupling the sprockets 3 and 5 together for transmitting rotation of the crankshaft 2 to the camshaft 4. Valves (not shown) of combustion chambers are opened and closed by the rotation of the camshaft 4.

A chain guide 8 pivotably supported around a pivot shaft 7 contacts the chain 6. The chain tensioner 1 presses the chain 6 through the chain guide 8.

The chain tensioner 1 comprises a cylindrical cylinder 9 having an open end and a closed bottom at the other end, and a cylindrical plunger 10 axially slidably inserted in the cylinder 9. The cylinder 9 is fixed to an engine block (not shown) with bolts 11.

Figure 2:
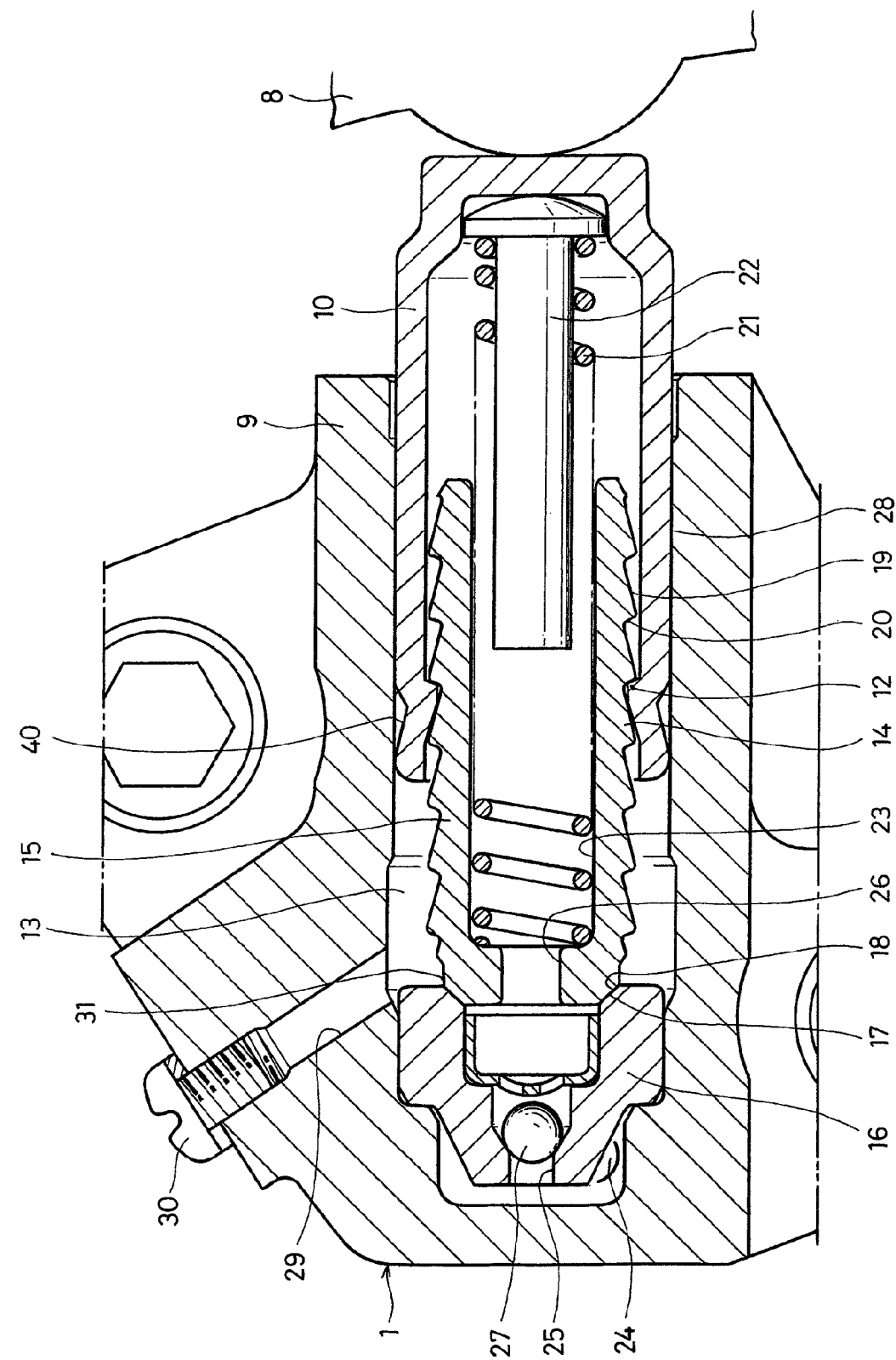
FIG. 2 is an enlarged view of the chain tensioner of FIG. 1 and its periphery.

As shown in FIG. 2, the plunger 10 has a closed end protruding from the cylinder 9 and abutting against the chain guide 8, and an open end inserted in the cylinder 9. An internal thread 12 is formed on the inner circumference of the plunger 10.

A screw rod 15 is mounted in a pressure chamber 13 defined by the cylinder 9 and the plunger 10. The screw rod 15 is formed with an external thread 14 on its outer circumference which is in threaded engagement with the internal thread 12. One end of the screw rod 15 protrudes from the plunger 10 and abuts against a rod seat 16 mounted in the cylinder 9. The contact surface 17 of the screw rod 15 contacting the rod seat 16 is a spherical surface having its center on the axis of the screw rod 15. A contact surface 18 of the rod seat 16 contacting the screw rod 16 is a conical surface.

The external thread 14 on the outer circumference of the screw rod 15 and the internal thread 12 on the inner circumference of the plunger 10 are double threads. Each of the external thread 14 and the internal thread 12 has a serration-shaped axial section with the flank angle of the pressure flank 19 thereof, which receives the pressure when the plunger 10 is pushed into the cylinder 9, larger than the flank angle of the clearance flank 20 thereof.

The flank angle of the pressure flanks 19 of the external and internal threads 14, 12 is determined such that the rotation of the screw rod 15 is stopped by frictional resistance between the pressure flanks 19 of the external and internal threads 14, 12 when static load is applied in the direction to push the screw rod 15 into the plunger 10. Also, the flank angle of the clearance flanks 20 of the external and internal threads 14, 12 is determined such that rotation of the screw rod 15 is allowed by sliding of the flanks 20 of the external and internal threads 14, 12 on each other when static load is applied in the direction to protrude the screw rod 15 from the plunger 10.

A return spring 21 is mounted in the pressure chamber 13. One end of the return spring 21 is supported by the screw rod 15, and the other end biases the plunger 10 through a spring seat 22 in the direction to protrude from the cylinder 10.

A spring receiving hole 23 is formed in the screw rod 15, receiving one end of the return spring 21 and thereby reducing the axial length of the chain tensioner 1. The spring receiving hole 23 is formed by forging.

In the cylinder 9, an oil supply passage 24 communicating with the pressure chamber 13 is formed. The oil supply passage 24 is connected to an oil supply pump (not shown) to introduce hydraulic oil from the oil supply pump into the pressure chamber 13. The oil supply passage 24 communicates with a through hole 25 formed in the rod seat 16. The through hole 25 communicates with the spring receiving hole 23 through an oil path hole 26 formed in the screw rod 15. Similarly to the spring receiving hole 23, the oil path hole 26 is formed by forging. At the outlet of the oil supply passage 24, i.e. in the through hole 25 of the rod seat 16, a check valve 27 is mounted for preventing reverse flow of hydraulic oil from the pressure chamber 13 into the oil supply path 24.

Between the sliding surfaces of the plunger 10 and the cylinder 9, a minute leak gap 28 is formed, through which hydraulic oil in the pressure chamber 13 leaks.

In the cylinder 9, an air hole 29 is formed, extending from the outer face to the inner face of the cylinder 9. On the inner circumference of the air hole 29, an internal thread is formed, which is in threaded engagement with a screw 30. Air in the pressure chamber 13 is exhausted through the screw gap of the screw 30.

Figure 3A:
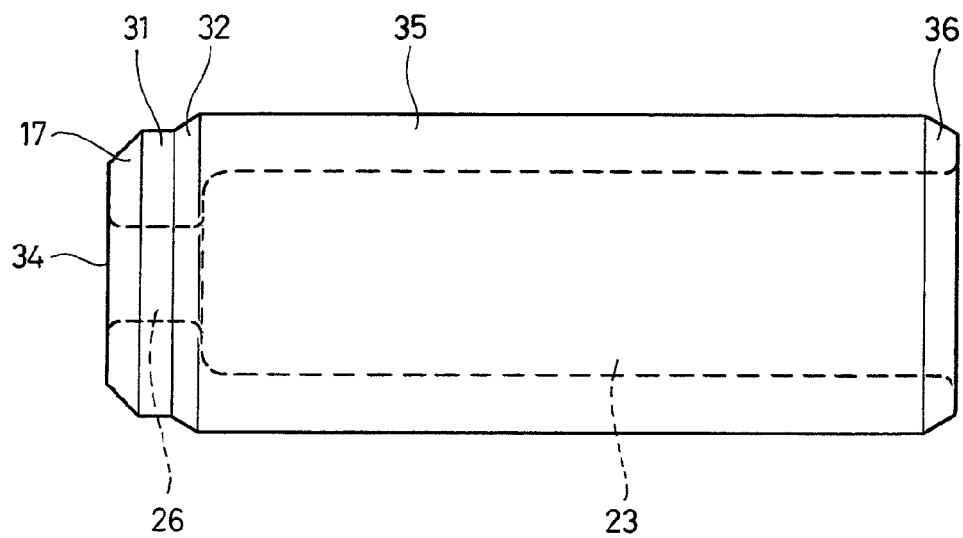
FIG. 3A is an enlarged view of a blank before being formed into the screw rod shown in FIG. 2 by rolling.
Figure 3B:
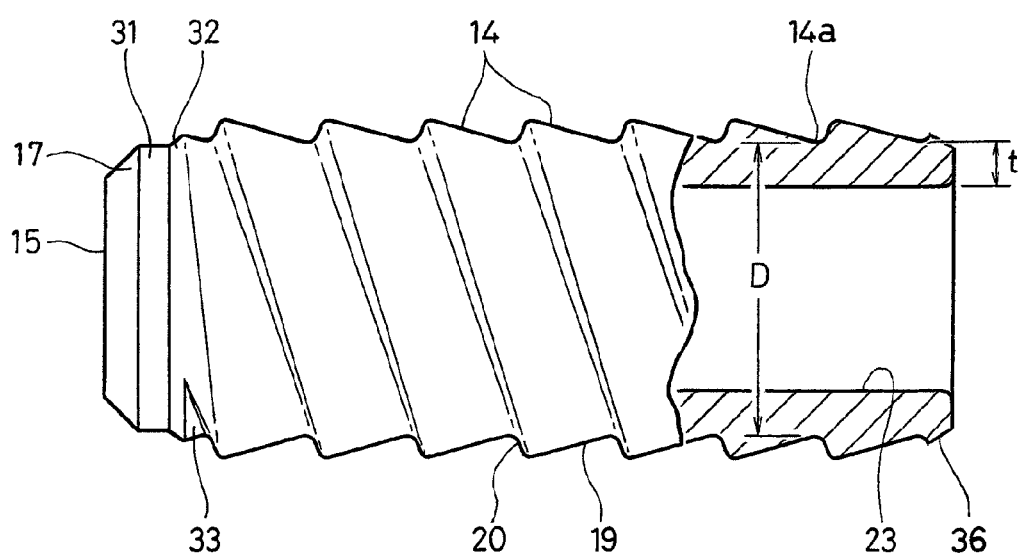
FIG. 3B is an enlarged view of the screw rod shown in FIG. 2.

The external thread 14 on the outer circumference of the screw rod 15 is formed by rolling. On the portion of the screw rod 15 protruding from the plunger 10, as shown in FIG. 3B, a cylindrical small-diameter intermediate portion 31 is provided, having a diameter smaller than the root diameter D of the external thread 14. On the axial end face of the intermediate portion 31, the contact surface 17 of the screw rod 15 that contacts the rod seat 16 is provided. This contact surface 17 of the screw rod 15 is formed by forging.

Also on the outer circumference of the screw rod 15, a chamfer 32 tapering from the end of the external thread 14 toward the intermediate portion 31 is provided, in which the end 33 of the external thread 14 exists. The wall thickness t of the screw rod 15 from the root 14a of the external thread 14 to the spring receiving hole 23 is determined not to be smaller than twice the height of the external thread 14. The root 14a of the external thread 14 is arc-shaped with its radius not larger than 0.05 mm.

On the surface of the screw rod 15, a carburized or carbonitrided layer is formed, which ensures wear resistance of the contact surface 17 of the screw rod 15 that contacts the rod seat 16 as well as wear resistance of the surface of the external thread 14. Surface hardness of the carburized or carbonitrided layer can be e.g. Hv 600 or higher.

The above-mentioned screw rod 15 may be formed, for example, as follows. First, as shown in FIG. 3A, a hollow blank 34 having the spring receiving hole 23 and the oil path hole 26 is formed by forging. With this forging, on the outer circumference of the blank 34, a cylindrical portion 35 with a diameter larger than the diameter D of the root 14a of the external thread 14 is formed, as well as a chamfer 36 tapered from one end of the cylindrical portion 35 to be smaller than the diameter D of the root 14a of the external thread 14, the chamfer 32 tapered from the other end of the cylindrical portion 35 to be to be smaller than the diameter D of the root 14a of the external thread 14, and the cylindrical intermediate portion 31 continuing to the chamfer 32. On the axial end face of the intermediate portion 31, the contact surface 17 of the screw rod 15 that contacts the rod seat 16 is formed. The cylindrical portion 35 is formed so that the surface roughness of the circumference is no larger than Rmax 6.3.

Next, the outer circumference of the cylindrical portion 35 is rolled to form the external thread 14 shown in FIG. 3B. At this time, a rolling die for the external thread 14 contacts and plastically deforms the cylindrical portion 35 but does not contact the intermediate portion 31. Thus, flow of the material when rolling the external thread 14 is absorbed at the intermediate portion 31, and deformation of the contact surface 17 caused by material flow is prevented. Then by carburizing or carbonitriding, the carburized or carbonitrided layer is formed on the surface of the screw rod 15.

Figure 4:
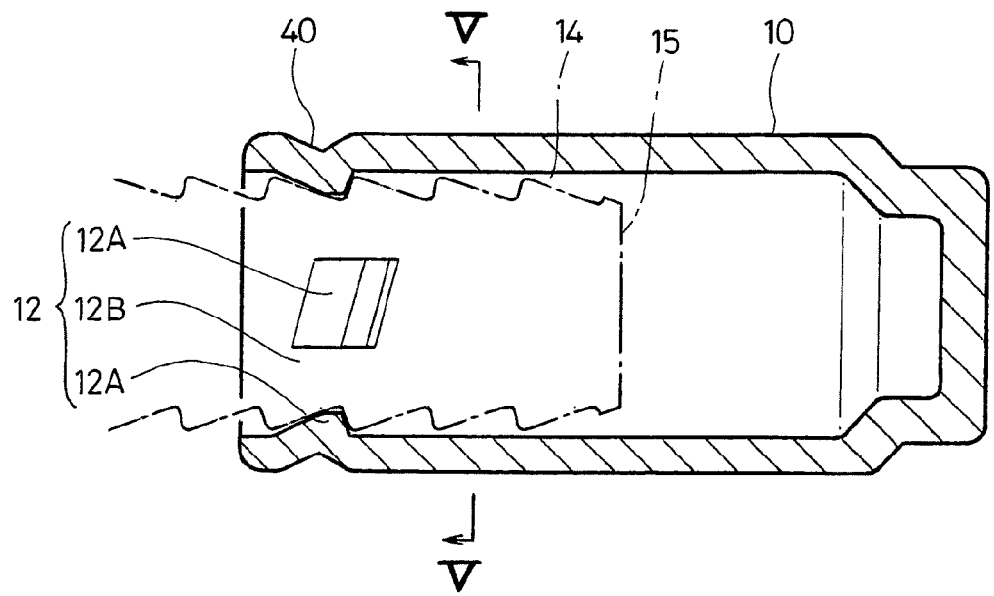
FIG. 4 is an enlarged sectional view of the plunger shown in FIG. 2.
Figure 5:
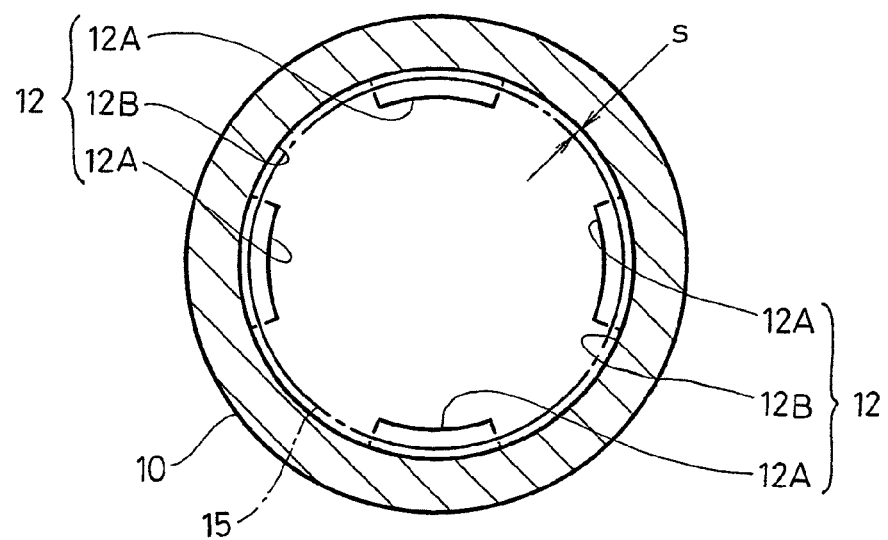
FIG. 5 is an enlarged sectional view taken along line V-V of FIG. 4.

The internal thread 12 on the inner circumference of the plunger 10 comprises, as shown in FIGS. 4 and 5, two or more (four in the figures) equiangularly spaced portions 12A each extending toward the adjacent portion 12A with a predetermined lead angle. The portions 12A are shorter in circumferential length than the circumferential spaces 12B therebetween. Surface roughness of the internal thread 12 is Ra 6.3 or lower.

As shown in FIG. 5, the size of a radial gap s between the outer diameter of the external thread 14 and the diameter of the circumferential spaces 12B is determined to be not larger than 0.5 mm.

Figure 6A:
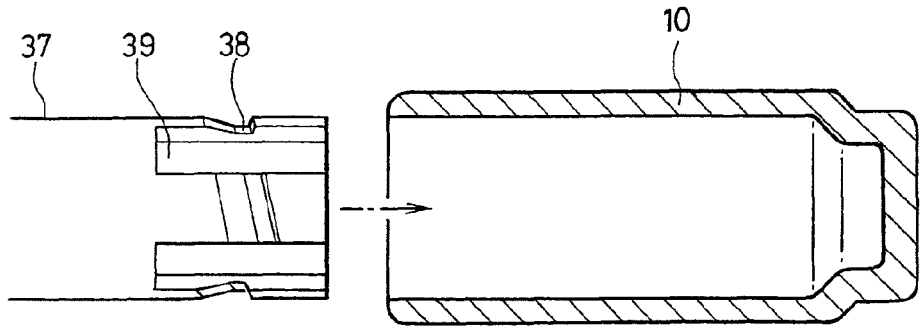
Figure 7:
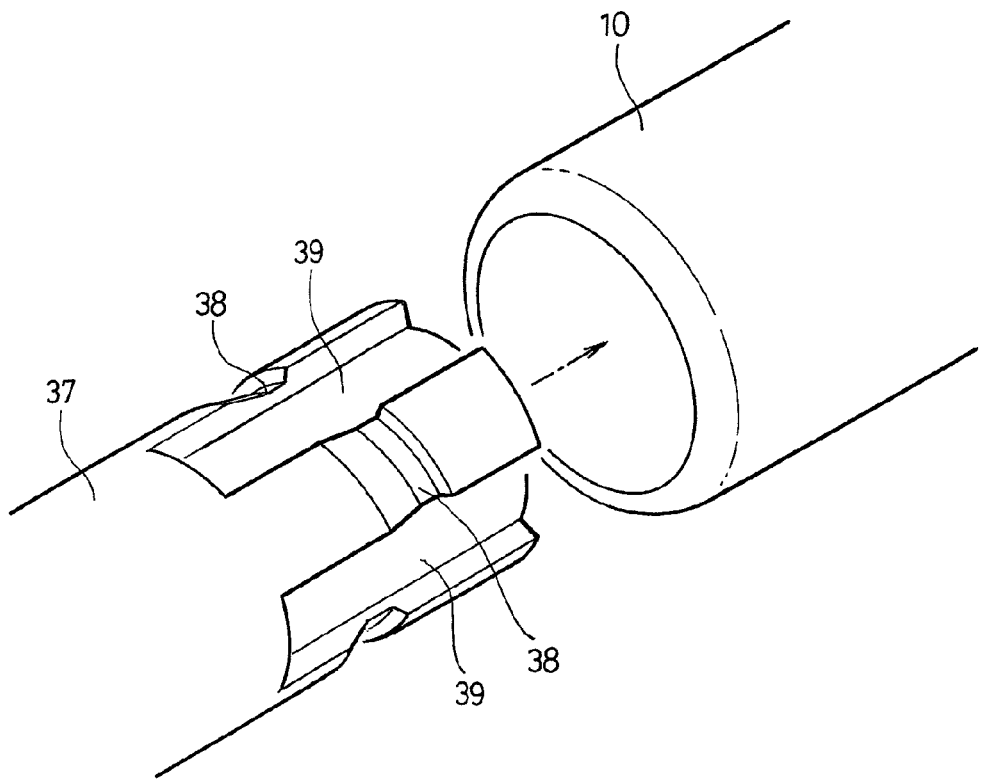
FIG. 7 is an enlarged perspective view of the round bar-shaped die and the plunger shown in FIG. 6A.
Figure 8:
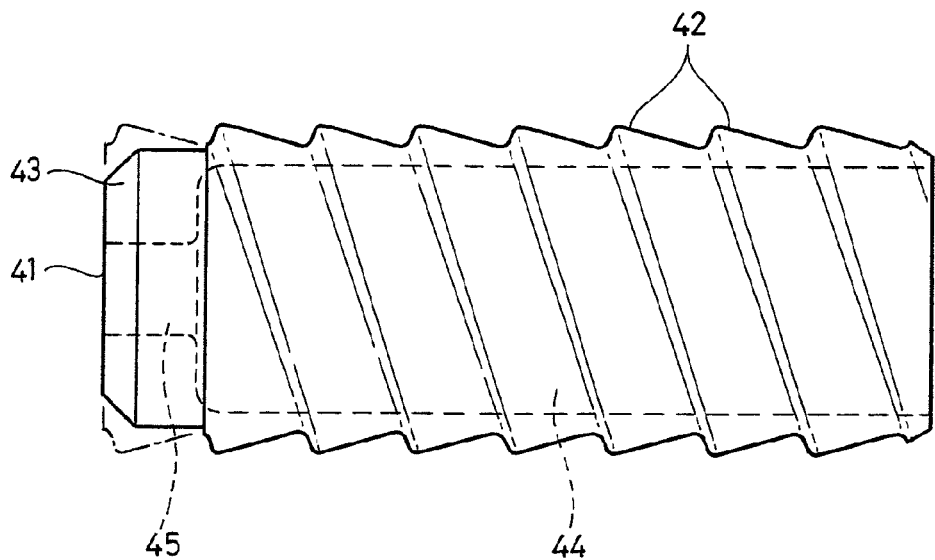
FIG. 8 is an enlarged view of a conventional screw rod of a chain tensioner.

The internal thread 12 is formed by pressing. This pressing may be done, for example, as follows. First, as shown in FIG. 6A, a round bar-shaped die 37 is inserted into the deep-drawn cylindrical plunger 10 having a closed end. On the outer circumference of the round bar-shaped die 37, as shown in FIG. 7, thread grooves 38 corresponding to internal thread of the plunger 10 and axial grooves 39 communicating with the thread grooves 38 are formed alternately in the circumferential direction.

Figure 6C:
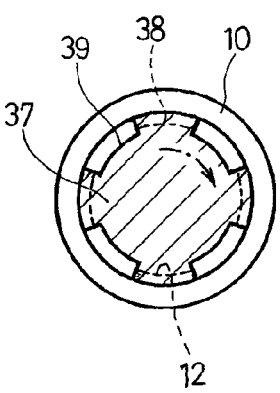
Figure 6B:
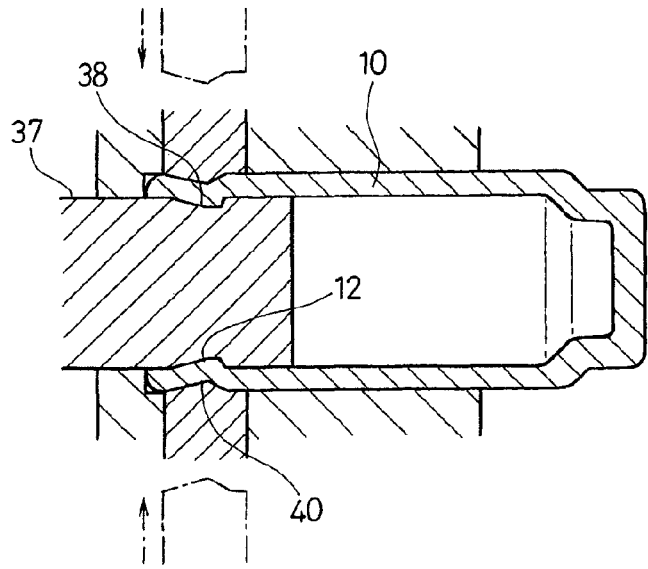

Next, as shown in FIGS. 6B and 6C, the outer circumference of the plunger 10 is pressed and the shape of the thread grooves 38 on the outer circumference of the round bar-shaped die 37 is transferred to the inner circumference of the plunger 10, thereby forming the internal thread 12. At this time, a pressed recess 40 is formed on the outer circumference of the plunger 10, corresponding to the internal thread 12.

Figure 6E:
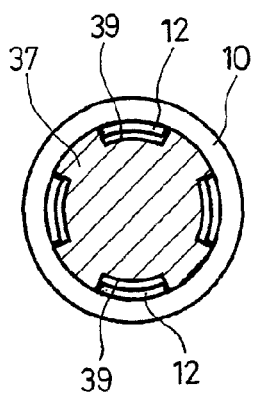
Figure 6D:
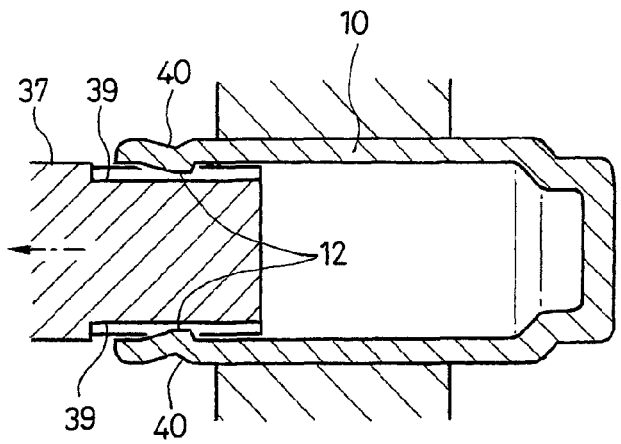

Then, as shown in FIGS. 6D and 6E, the round bar-shaped die 37 is rotated until the internal thread 12 of the plunger 10 is received in the axial grooves 39 of the round bar-shaped die 37. In this state, the round bar-shaped die 37 is pulled out of the plunger 10 in the axial direction. Then the plunger is carbonitrided so as to increase wear resistance of the internal thread 12.

Next, the operation of this chain tensioner 1 is described.

When the tension of the chain 6 decreases during operation of the engine, the plunger 10 moves in the protruding direction by biasing force of the return spring 21, thereby absorbing the loosening of the chain 6. At this time, hydraulic oil supplied from the oil supply pump flows into the pressure chamber 13 through the oil supply passage 24, thereby moving the plunger 10 quickly.

When the tension of the chain 6 increases during operation of the engine, the plunger 10 is pushed into the chain tensioner 1 by the tension of the chain 6, thereby absorbing the tension of the chain 6. At this time, the screw rod 15 rotates relative to the plunger 10, moving forward and backward within the axial gap between the internal and external threads 12 and 14 because of vibration of the chain 6. Also, hydraulic oil flows out of the pressure chamber 13 through the leak gap 28 between the sliding surfaces of the plunger 10 and the cylinder 9. Viscous resistance of hydraulic oil makes the plunger 10 move slowly with its dampening effect.

When stopping the engine, tension of the chain 6 may increase depending on the stop position of the cams (not shown) connected to the camshaft 4. However, in this case, since the chain 6 does not vibrate, the internal thread 12 of the plunger 10 is received by the external thread 14 of the screw rod 15, thereby fixing the position of the plunger 10. This reduces loosening of the chain 6 when restarting the engine, thereby making restart of the engine smooth.

In this chain tensioner 1, since the contact surface 17 of the screw rod 15 contacting the rod seat 16 is formed by forging, there is no need of machining to form the contact surface 17. Also, the spring receiving hole 23 and the oil path hole 26 are forged and they do not need machining. This makes the process cycle time of the screw rod 15 shorter and reduces its cost.

Since this chain tensioner 1 has a chamfer 32 tapering from the end of the external thread 14 to the intermediate portion 31, the rolling die for rolling the external thread 14 is smoothly led in, thereby rolling the external thread 14 with high accuracy.

In this chain tensioner 1, the wall thickness t of the screw rod 15 from the root 14a of the external thread 14 to the inner face of the spring receiving hole 23 is not smaller than twice the height of the external thread 14. This maintains rigidity of the screw rod 15 when rolling the external thread 14, thereby keeping roundness of the screw rod 15 during rolling.

In this chain tensioner 1, the internal thread 12 on the inner circumference of the plunger is formed by pressing. This saves cycle time and cost of processing the internal thread 12 compared to the case when the internal thread is formed by machining.

In this chain tensioner 1, since the internal thread 12 on the inner circumference of the plunger 10 is formed by pressing, the surface of the internal thread 12 is smooth. Thus without a smoothing process for the surface of the internal thread 12 after pressing, the surface roughness of the internal thread is made to be no larger than Ra 6.3, thereby reducing the processing cost. When the surface roughness of the internal thread 12 is not larger than Ra 6.3, excessive frictional resistance between the external thread 14 and the internal thread 12 can be prevented.

In this chain tensioner 1, the radial gap s between the outer diameter of the external thread 14 on the outer circumference of the screw rod 15 and the diameter of the circumferential spaces 12B of the internal thread 12 on the inner circumference of the plunger 10 is not larger than 0.5 mm. This makes the outer circumference of the screw rod 15 guided by the inner circumference of the plunger 10, thereby preventing the screw rod 15 from slanting. Contact between the external thread 14 and the internal thread 12 is thus stable, making operational reliability higher.

What is claimed is:

1. A chain tensioner comprising:
a cylindrical cylinder having open and closed ends;
a cylindrical plunger axially slidably inserted in said cylinder;
a return spring biasing said plunger in a protruding direction from said cylinder, said plunger having an open end inserted in said cylinder and a closed end and formed with an internal thread on the inner circumference; and
a screw rod having an external thread that is in threaded engagement with said internal thread of the plunger;
wherein a portion of said screw rod protruding from said plunger abuts a rod seat provided in said cylinder;
wherein said external thread on the outer circumference of said screw rod is formed by rolling;
wherein a cylindrical intermediate portion having an outer diameter smaller than the diameter of the root of said external thread is provided on a portion of said screw rod protruding from said plunger;
wherein a contact surface to be brought into contact with the rod seat is provided on the axial end face of said intermediate portion; and
wherein said contact surface is a forged contact surface.

2. The chain tensioner according to claim 1 wherein a chamfer tapering from the end of said external thread to said intermediate portion is provided on the outer circumference of said screw rod.

3. The chain tensioner according to claim 1 wherein a spring receiving hole for receiving one end of said return spring is formed in said screw rod and wherein said spring receiving hole is formed by forging.

4. The chain tensioner according to claim 3 wherein the wall thickness of the screw rod from the root of said external thread to said spring receiving hole is not smaller than twice the height of said external thread.

5. The chain tensioner according to claim 3 wherein an oil supply passage is provided in said cylinder for introducing hydraulic oil into a pressure chamber defined by said plunger and said cylinder, wherein a through hole is formed in said rod seat, communicating with said oil supply passage, wherein an oil path hole is formed in said screw rod, communicating said through hole with said spring receiving hole, and wherein said oil path hole is formed by forging.

6. The chain tensioner according to claim 1 wherein a carburized or carbonitrided layer is formed on the surface of said screw rod.

7. The chain tensioner according to claim 6 wherein surface hardness of said carburized or carbonitrided layer is Hv 600 or higher.

8. The chain tensioner according to claim 1 wherein said internal thread comprises a plurality of circumferentially spaced portions.

9. The chain tensioner according to claim 8 wherein said internal thread is formed by pressing, and wherein a pressed recess is formed on the outer circumference of said plunger, corresponding to said internal thread.

10. The chain tensioner according to claim 8 wherein said plurality of circumferentially spaced portions of said internal thread are arranged at equal angular intervals with circumferential spaces defined between adjacent circumferentially spaced portions, and each of said circumferentially spaced portions is shorter in circumferential length than said circumferential spaces.

11. The chain tensioner according to claim 8 wherein surface roughness of said internal thread is not larger than Ra 6.3.

12. The chain tensioner according to claim 8 wherein said plunger is carbonitrided.

13. The chain tensioner according to claim 8 wherein said plurality of circumferentially spaced portions of said internal thread are arranged with circumferential spaces defined between adjacent circumferentially spaced portions, and a radial gap between the outer diameter of said external thread of said screw rod and the diameter of said circumferential spaces is not larger than 0.5 mm.

* * * * *